CATHODE-RAY TUBE FOR POLYCHROME TELEVISION APPARATUS

Filed April 4, 1951

INVENTOR.
ERNEST O. LAWRENCE
BY
Lippincott & Smith.
ATTORNEYS.

Patented Oct. 14, 1952 2,614,231

UNITED STATES PATENT OFFICE 2,614,231

CATHODE-RAY TUBE FOR POLYCHROME TELEVISION APPARATUS

Ernest O. Lawrence, Berkeley, Calif., assignor to Chromatic Television Laboratories, Inc., San Francisco, Calif., a corporation of California Application April 4, 1951, Serial No. 219,240

18 Claims. (Cl. 313—72)

This invention relates to cathode ray tubes for displaying polychrome television images. It is particularly directed to cathode ray devices wherein the images become visible from a luminescent screen or target within the tube through the use of a multicolor additive color reproduction method which is completely free from the requirement that any sort of optical system need be interposed between the target and the observer for bringing individual color images into proper registration or superposition.

It has already been set forth in copending United States patent application Serial No. 150,732, filed March 20, 1950, by this inventor (the substance of which is incorporated herein by reference), that a television tube having a target area producing the image in one component color of an additive system may have functioning therewith suitable forms of electrical control components or apparatus whereupon the image may be reproduced in other component color images to become visible through the first target area in precise registry with the image produced upon the first target area. Also, it was explained in the identified application that certain phosphors or other forms of luminescent compounds which become activated by electron beam impact to produce luminous effects representing an image in one component or primary color may be of such a character as to be generally translucent to light directed to be passed therethrough, and yet sufficiently concentrated to produce a satisfactory image for viewing when impacted directly by a modulatable cathode ray beam.

According to the color television methods currently proposed, additive color pictures produced by either simultaneous or sequential forms of operation are preferred. Because of the bandwidth reduction customarily obtainable by following sequential methods of color reproduction, such proposals are, at the moment, considered to offer the greatest advantages from the standpoint of operational efficiency. They are consequently most likely to be adopted in the final state of color operations. Various forms of sequential means, including field-sequential, line-sequential, segment-sequential and dot-sequential methods, with or without dot interlace and the so-called "mixed highs," have been proposed and are currently under investigation.

The present invention discloses an image reproducing tube of the all-electronic type for recreating color television images of the polychrome variety which is adaptable for use with any or all of these systems without the need of any sort of tube modification to distinguish between the different systems. Likewise, regardless of the system with which the tube is used, the same freedom from color registration difficulties is preserved upon image creation.

As was disclosed in the already-mentioned copending application of this inventor, provisions are made whereby a modulatable signal-controlled cathode ray beam may be directed through a cathode ray color image-producing tube to impact at one end of the tube a phosphor or luminescent compound to recreate the image in one color. This color is, for instance, one to which the eye is particularly sensitive. The actual selection of phosphor or other luminescent material for the end wall coating, however, is somewhat a matter of choice. Illustratively, where definition is the primary consideration the end coating may be a phosphor to produce green light, but if greater overall brilliance is the paramount factor and the phosphor to produce red light is the least efficient that phosphor can advantageously coat the target in order to obtain the greatest overall picture brilliance.

Disposed in a region substantially adjacent the target area whereupon the first image is created (or even in direct contact therewith) there is positioned a grating formed of a plurality of parallelly-positioned plates having their edges substantially adjacent or in contact with the tube end wall and so positioned that the flat surface is arranged substantially normal to that end wall target. The signal-controlled cathode ray beam directed to trace a raster upon the tube end wall is required to pass between the plates in order to reach that end wall area.

The grating so formed, and which comprises a plurality of flat plate elements, is so constructed that the plate elements, which are formed of electrically conductive material, are supported in a manner such that they are electrically insulated one from the other. Provision is made for connecting the alternate plates together electrically. In this way, by providing suitable external electrical connections, it is possible to maintain the alternate plate pairs, which may be considered as inter-leaved one with the other, at such relative potential with respect to each other that in an equilibrium state a signal-controlled electron beam directed toward the fluorescent target will pass substantially midway between each of the plates of the grating as it is deflected bidirectionally to trace the raster. The plates preferably are separated one from the other by distances which are no greater than the width of the line scanning traces forming the lines of the traced raster. The separation is thus preferably no greater than the diameter of the scanning beam as it is directed toward the target but distances less than that of the spot size are usable and are often to be preferred as set forth in the mentioned copending application.

It is important in the practical operation of a tube of the type herein proposed that adequate provision should be made for avoiding any possible color contamination. This may readily be achieved through the use of suitable diaphragms, as shown more particularly by U. S. patent application Serial No. 157,943, filed April 25, 1950, by this inventor. An alternative and perhaps even more desirable method of preventing such color contamination is by electrostatic lens elements operating with post acceleration in the region adjacent the target area. Copending U. S. application of this inventor filed concurrently herewith as Serial No. 219,213, and entitled "Cathode Ray Focusing Apparatus," discusses at length and claims such a lens arrangement. Reference to each of the last-named applications is incorporated herein for the features defined. However, for reasons of simplicity of illustration and to avoid duplication of operational description and structure, the drawings of the instant application will omit both a showing of such lens systems and baffles, although each will be understood to form operational components for use in conjunction with this invention.

The conducting plates or strips which form the interleaved grating should generally be of a width which is about ten times the separation of the strips one from the other. As was mentioned in the copending application, Serial No. 150,732, hereinbefore identified, the strip width is not critical. The higher the operating potentials usable the greater the reduction in strip width without impairment of the quality of the resultant color television images. The actual alinement of the strips is not critical, although it is to be noted that the individual strips which collectively from the grating should be disposed in approximately parallel relationship one with respect to the other. In this way the scanning electron beam will be directed to the grating from a point of origin such that the moving beam reaches an edge of the conducting strips or plates, and as it passes between these plates it becomes subject to the effect of the voltages there applied. With no potential difference between the sets of plates, the beam will move through and between the plates, substantially without contact thereon to impact the tube target or end wall surface. With potential differences existing between the plates, the scanning beam will be moved toward one or the other of the plates to such an extent that it will not pass between the plate pairs to reach directly the partially-transparent phosphor or luminescent coating on the tube end wall or target.

The conducting plates or strips forming the grating preferably have luminescent compounds or phosphors coated thereupon so that when control potentials are applied to the interleaved plate pairs in such a way that one plate pair, for instance, is maintained positive relative to some equilibrium potential value, while the other plate pair is held either at the equilibrium value or at some other suitable potential relative thereto, the scanning beam will reach that plate which is positive with respect to the assumed equilibrium value, and cause fluorescence or phosphorescence. It also may be considered that a difference in potential between adjacent plates provides a transverse electric field that deflects the scanning beam appropriately to the plates of one color or the other. The voltage gradient produced between the plates of the first set with respect to the second set is such that in one direction the electron beam directed from a suitable source toward the tube target will be directed upwardly (or left or right, for instance) toward the plates of one set of the interleaved pair, and in the reverse direction of applied signal polarity will be directed downwardly against the other plate elements of the second set. By coating the different plate elements alternately with suitable luminescent compounds, usually for a tricolor system coating with materials to produce light in two of the three component colors collectively adding to produce white, it is possible by selectively controlling the beam impact position to direct the beam first to one of the plate sets of the grating to produce light in one color. Later, with the potentials reversed, for instance, the beam will be deflected in such a way that it strikes the plates of the second set of grating members to produce light in the third color.

According to preferred embodiments, the tube end wall target area is coated with the usual phosphor or other form of luminescent compound which reacts under the influence of impacting electron beam to produce light in one color. This may be in any one of the three component or primary colors of red, green and blue which normally additively combine to produce white light.

Because of a desire to obtain brilliant images it is often desirable that the red light shall be developed on the tube end wall since the red phosphor is usually the least efficient, as was hereinbefore mentioned. However, the green phosphor may be more desirable in cases where definition is paramount. In any case, the proposal as to the specific color is purely illustrative and not limiting and thus, solely to illustrate one form of tube, the green phosphor will be assumed to coat the end of the tube, with red and blue light-producing phosphors on the plates of the grating. In this sense, one of the sets of plates forming the grating is coated with luminescent compound to produce red, and the other set of the plate pairs is coated with the luminescent compound of phosphor to produce blue. The magnitude of the control voltage required to deflect the scanning beam to cause it to strike one or the other plates of the grating has been found to be only about 4% of the voltage required to accelerate the beam, when the strips of the grating are of a width of the order of ten times the separation.

Prior art arrangements of this general character function satisfactorily to produce light from the conducting strips from the grating when impacted by the electron beam itself, and this light is visible in its proper color through the translucent coating on the end wall of the tube. The beam impacts the grating strips, however, at a low angle of incidence, and this is conducive to some reflection or rebounding of the electrons of the beam, as well as the actual emission of secondary electrons from the impacted surface. Therefore, there are present, in the neighborhood of the phosphor coated surfaces, some randomly directed electrons which will strike portions emissive of colors other than that intended, at the moment, to be excited.

This superimposes upon the intended color a greater or less intensity of other hues. Theoretically this might result in serious color contaminations; i. e., a definite change of hue.

More generally, however, since the direction of these electrons which are not part of the beam itself is random, the unintentional excitation of the different phosphors will be substantially equal, and the result is a mere dilution of the intended color with white, the degree of dilution depending on both the number and the velocities of the random electrons. The presence of the effect therefore does not destroy the usefulness of the devices wherein it occurs, nor prevent them from displaying pleasing images. It does, however, tend to make these images somewhat pale or "pastel" in character, and therefore, is undesirable and to be avoided.

The present invention has as one of its aims and objectives that of providing for more precise duplication of the recreated color image with that of the scene of the transmitter or pickup point. To this end the device herein to be described makes use of suitable forms of baffle or control elements which generally preclude the scanning cathode ray beam from being able to initiate more than a single color response at any instant within the tube. The baffle arrangement herein to be described is so constructed that an electron-impermeable and yet optically transparent element may be cooperatively associated with the grating strips or plates in such a way as to intercept the scanning beam intended to create light effects of one color on the grating strip after such color light image has been initiated. Thus, no color effects can result from excitation of the luminescent coating or phosphor on the tube target or end wall by virtue of a scanning electron beam reaching it after having first initiated light in some other color as a result of beam impact on a grating strip as the target of impact.

Further, the present invention provides ways and means for avoiding certain shortcomings of apparatus of the prior art by making readily possible the addition of suitable optical filters which serve generally to nullify actual color differences between the light produced by the excited phosphors and that color of light which is preferred as a primary or component color, in order to insure the widest possible variation of color shades and hues in the finally-recreated image. The optical color filter so added preferably has its response peaked at a light wavelength such that the coordinates provide increased area within the color triangle within which various light values may be represented.

The baffle or barrier elements are attached to the elongated flat strips or plates which form the grating. They are so arranged as to extend for the full length of the grating strips along the edge thereof adjacent the tube target or screen. They protrude from either side of the flat strips of the grating for only a minor fraction of the distance separating the adjacently-positioned grating strips. In this way the electron scanning beam which is directed through the grating toward the tube target passes substantially midway between the grating plates during those periods of time when no potential differences are applied to the grating strips so that the baffle elements offer no interference to the beam impacting the tube end wall or target to produce light in the selected component color corresponding to that used to coat the said tube end wall. On the other hand, with the application of a suitable control voltage to the plate pairs of the interleaved strips of the grating, it will be appreciated that the scanning beam is not only arranged to strike either the under or the upper surface of the selected grating plates or strips, but also that those electrons of the scanning beam which strike the strips or plates at such a low angle of incidence as to be reflected therefrom at a like angle (in much the same manner as an optical light ray is reflected from a mirror surface) proceed in the direction of the coating on the tube end wall or target but are finally intercepted or blocked by these baffle elements. The result is that contamination of the color image resulting from an impacting scanning beam intended to represent the image in one color producing a response from a luminescent coating or phosphor in a different color is entirely precluded. By coating the surface of the baffle which is adjacent the conducting strip of the grating with a suitable luminescent compound or other form of phosphor, the amount of light which is developed by an impacting scanning cathode ray beam is materially increased with respect to tubes heretofore known.

Furthermore, it is possible when utilizing a baffle structure of this variety to provide a coating on the surface of the baffle remote from that from which the beam directed thereto emanates to provide a coating of optical filtering material such that the light generated by the scanning electron beam impacting the luminescent compound or other phosphor or the grating plates can be viewed only through this optical filter. The result is that variances in the color of light developed by the phosphor or other luminescent compound in the grating surface itself may be additively combined with the light of other portions of the image by such color when seen through the filter as to provide precisely the proper color balance.

In its preferred form the baffles may assume several different configurations. As such they may be in the form of V-shaped elements or troughs which have the open end of the V face toward the source of the scanning electron beam and the closed end of the V form the edge along which attachment is made to the baffle strip per se. In other forms the baffle may be in the nature of a flat strip which is supported from the strips of the grating at substantially right angles thereto and secured to the grating strip at the edge coinciding with the bisector of the baffle strip along its long dimension.

Various other forms of baffle strips to be described in the description to follow are also usable and within the scope of the disclosure of this invention.

In the light of the foregoing, it becomes an object of this invention to provide a tube for recreating color television images according to any desired pattern of scanning, be it additive-sequential or additive-simultaneous, so that improved color fidelity in the finally-produced picture results. In instances where simultaneous image recreation is desired, it will, however, be appreciated from what is to follow, that it is preferable to provide more than a single electron gun within the tube to develop a plurality of scanning cathode ray beams which may be individually controlled to represent the image in the selected component colors of the polychrome.

It is a further object of the invention to provide an electron tube and particularly a grating structure thereof for recreating the color images wherein increased efficiency of color conversion results.

A further object of the invention is to provide a tube for creating polychrome color images of higher fidelity, but with simpler apparatus as the controlling medium for developing of the said images.

Other objects of the invention are to provide color images which shall more accurately portray the precise subject viewed at the transmitter in its generally true colors, and which apparatus is yet extremely simple to control and operate, efficient in its use and capable of manufacture under mass production procedures to permit sale at prices which are below those tubes in which hand assembly is required.

Other objects of the invention will become apparent from a consideration of the following description and claims, in connection with the accompanying drawing, wherein:

Fig. 1 illustratively represents in section the target end of one form of cathode ray tube to show the relative position of the grating and baffle elements with respect to the tube target when viewed from a plane transverse to that along which the scanning beam moves over the tube target;

Figure 1:
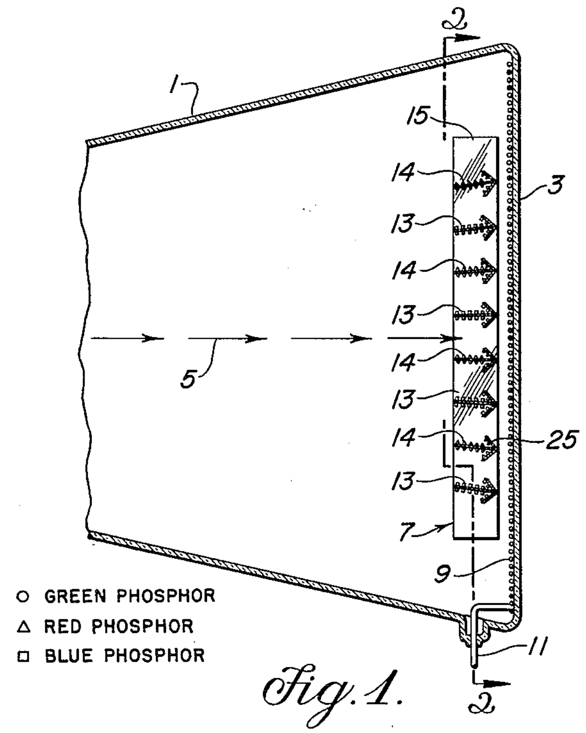

Referring now to the drawings, and first to Fig. 1, the device comprises an evacuated envelope 1, shown only in part for the sake of convenience. This tube envelope may be of either glass or metal. Likewise, it may be of the so-called conical form or rectangular, as desired, with a circular or rectangular transparent window 3 at one end thereof.

While not shown for convenience of illustration, there is provided in a neck-like structure, secured substantially at the cone apex, the usual electron or cathode ray scanning beam producing components. These components as disclosed in the already-mentioned copending application Serial No. 150,732, comprise the usual electron-emitting cathode, suitable anode elements, and electron beam controlling electrodes whereby signal modulation may become effective to vary or otherwise control the intensity of the cathode ray beam emanating from the gun. The cathode ray beam is illustratively represented at 5 in Fig. 1, with the arrow designating generally its path in an undeflected state toward the tube end wall or transparent window 3.

As was also explained in the copending application mentioned, suitable deflection coils or plates, or a combination of coils and plates, are provided for causing the developed cathode ray beam to trace a suitable raster on the end of the cathode ray tube. Illustratively, this raster is generally rectangular in shape, and by present standards for black-and-white television the operation is such that the scanning modulatable cathode ray scanning beam 5 is deflected in linear paths at a rate of 15,750 sweeps per second horizontally, and, concurrently, 60 vertical deflections per second are produced. These repeated deflections develop rasters on the viewing window at the rate of 60 per second. Each such raster is formed of 262½ lines (neglecting blanking), which are interlaced in the well-known 2:1 interlace pattern. As the scanning beam is directed through the tube envelope 1, toward the viewing window 3, it is arranged to pass through a grating structure conventionally represented at 7, which is composed essentially of a series of elongated flat conducting strips or plates suitably supported in electrically insulated manner one with respect to the other.

Coating the interior surface of the end wall or target 3, forming the luminescent target area of the tube, is a suitable fluorescent compound or a phosphor 9. This coating usually is deposited directly upon the interior tube wall by methods well known in the art. The phosphor is much the same as that found in the ordinary well-known monochrome type of cathode ray tube, except for the fact that the phosphor layer so deposited is sufficiently thin as to be generally translucent to light developed from within the tube. The particles of phosphor 9 deposited upon the window or end wall 3 to form the screen are each generally microscopic in size, although they are reproduced in the figure of the drawing which for reference purposes is a plurality of discrete circles, for reasons which will hereinafter more fully appear.

In the preferred form of the tube herein to be disclosed, the end wall or viewing window 3 is preferably coated with a phosphor adapted to emit green light under the electron beam impact and excitation. The green light-producing phosphor, hereinafter to be termed the "green" phosphor, is designated by the circular symbols.

As already pointed out, the phosphor coating at different portions is optional as to its color-producing properties. The characterization suggested for different areas by the drawings is purely illustrative.

In instances where an electrostatic lens system or a diaphragm is used so that the electron beam can be caused to pass between the baffles or strike the phosphors on the baffles the baffle may be aluminized. Where the baffles are positioned directly upon the target forming the tube end wall or a final beam target in the general region of the tube end wall the baffle phosphor coating may be aluminized over the area between adjacent baffles without cutting down the light from the baffles. The aluminum coating is applied usually in a manner well known to provide an extremely thin metallic layer suitable for rendering it conductive. Such a layer may be formed by the evaporation of the aluminum according to principles well known in the art.

Figure 2:
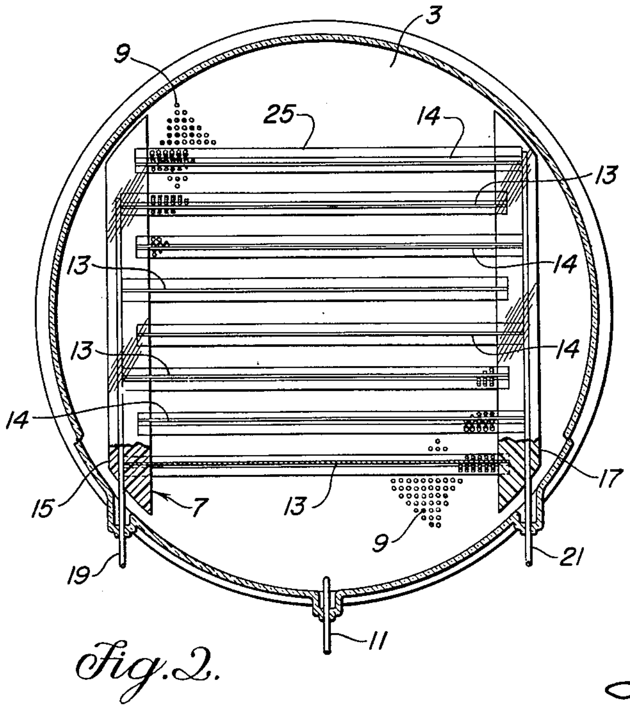
Fig. 2 is an end view of the tube, taken substantially on the line 2—2 of Fig. 1, looking in the direction of the arrows to show particularly the relative positioning of the grating and baffle elements with respect to the main tube target.

A lead 11 is arranged to supply suitable electrical potentials to this screen relative to the electron-emitting cathode forming the electron beam so that the impinging electron beam is given a final acceleration immediately as it strikes the coated screen area 9. The grating 7 through which the cathode ray beam 5 is directed to reach the phosphor coating 9 upon the screen 3 is located in proximity to the green phosphor coating 9. It may contact the end target or be positioned close thereto. The grating structure itself is formed of elongated electrically conducting strips 13 and 14, which, for instance, as shown by Fig. 2, are supported at their ends in slots, formed in the insulated ends of supports 15 and 17. Various other support methods may be used. That shown is illustrative of the principle involved.

It was explained in the copending application to which reference has already been made that the strips are staggered slightly lengthwise, as also indicated by Fig. 2, in such a way that the strips 13, for instance, project beyond strips 14 where they are secured to the support 15, whereas other of the strips 14 project in the other direction where they attach to the support 17. The electrical conductors in the form of leads 19 and 21 are provided for maintaining electrical contact with the strips supported and held from the different supports 13 and 15. This permits electrically connecting the strips 13 to the conductor 19 and electrically connecting the strips to the conductor 21.

Suitable control of the operating voltages upon the sets of conducting strips may be established by way of the connection through conductors 19 and 21. These connections may comprise suitably-switched sources of voltage which are controlled in any suitable manner (not shown) to render the strips 13 and 14 at equal potential with respect to each other, or to render the strips 13 positive relative to the strips 14, or vice versa, depending upon the color of light instantaneously to be reproduced. The mentioned copending application has explained the manner in which this form of control is achieved. Therefore, for purposes of explanation herein, suffice it to say, illustratively, that if the tube is being utilized to produce a field-sequential color image, the strips or plates 13 and 14 may be held at equal potential relative to each other, during one vertical or field scansion period. For the next vertical or field scansion period the strips or plates 13, for instance, may be held positive with respect to the strips 14. During the third field scansion the strips 14 may be held positive relative to the strips 13. It therefore will become apparent that an electron beam 5 directed, as indicated by Fig. 1 and as explained in the named copending application, toward the viewing window 3 will pass directly between the sets of grating strips 13 and 14 at time periods when these strips are of equal potential with respect to each other, since no additional deflecting force will become effective upon the scanning cathode ray beam. During the period when the strips 13 of the grating are positive relative to the strips 14, the cathode ray scanning beam 5 will be bent or deflected in a direction such that it tends to impact the more positive of the two strips. Consequently, the cathode ray scanning beam 5 may reach those strips to impact either the upper or the lower surface thereof, depending upon the direction of beam emanation. Under these circumstances, the cathode ray scanning beam 5 will not tend to reach the phosphor coating of the tube end wall, nor the strips 14 of the interleaved set. For the opposite condition, the cathode ray scanning beam 5 will impinge upon the strips 14 to the exclusion of the strips 13 and the phosphor coating 9 on the tube end wall. While no particular form of switching apparatus to provide the control upon the scanning beam has been illustrated, it will be apparent, of course, that such arrangements may be mechanical in nature, or they may be electronic, and controlled in accordance with a color phasing signal, for instance, sent as a part of the composite video signal from the transmitter.

Where the operation is directed to line-sequential methods it will be apparent, for instance, that for one line of the picture the cathode ray scanning beam 5 may pass between the interleaved strips 13 and 14 of the grating to reach the phosphor coating on the target area 3. For the next line scanned the operation may be such that the cathode ray scanning beam contacts one or more (depending upon strip spacing) of the strips or plates 13. For the third line the cathode ray scanning beam may be caused to contact and impinge upon one of the strips 14 to the exclusion of any of the strips 13 and the phosphor coating the end wall target 3. The cycle then may repeat in a selected sequence.

For conditions of segmental-sequential and dot-sequential operations, the switching rate will be much higher than those already described. In segmental-sequential it will correspond to that rate in which different segments of the picture are sampled. The highest switching rate will be effected for the dot-sequential methods in which the cathode ray scanning beam must impact different target areas at a change in position at a rate at least as high as that at which each point in the image is scanned.

It as been assumed illustratively from what is shown herein that the strips 14 are coated with phosphor producing red light, as indicated by the triangular representations. The phosphors producing the blue light, as indicated by the square representations, are assumed herein illustratively to coat the strips 13 of the grating. While the strips 13 and 14 may be located in planes substantially parallel to one another, they may, in the alternative, as indicated, for instance, by Fig. 1, be arranged in planes slightly tilted with respect to each other, so that the projections of these lanes may be assumed to intersect in a common line which is substantially at the aperture of the electron gun from which the scanning beam 5 is released.

The copending application, e. g., Serial No. 150,732, has disclosed ways and means for achieving this result, and therefore it will be understood that this specific feature forms no part of the present invention except as in the entire combination. While the last-named copending application also mentioned that the width and length of the strips 13 and 14 was varied in accordance with the size of the tube in which the arrangement is used, and in accordance with the area of the raster to be formed, it, of course, will be appreciated that considerable variation in size is permissible within the scope of the invention. It also will be apparent that the spacing between the strips 13 and 14 of the grating is likewise subject to wide variation. Illustratively if the width of the strips 13 and 14 is generally ten times that of the separation between them, it is possible to deflect a cathode ray beam 5 entering between such strips, to an extent sufficient to cause it to impact one or the other of the strips 13 and 14 by the application of a potential difference between the strips which is of the order of only 4% of that required to give the electron beam its initial velocity sufficient to produce light of desired brilliance upon striking the phosphor coating upon the viewing end wall 3 of the tube. Illustratively, for a condition where the tube is operated in such a way that the effective voltage on the electron gun is 10,000 volts relative to cathode, a voltage difference of only 400 volts between the strips 13 and 14 is adequate to deflect the beam 5 entering there between to an extent sufficient to cause it to impact one of the strips, rather than to pass between the plates directly to the phosphor coating 9 to excite it to a luminescent state. The spacing may be of the order of one-half the minimum dimension of image analysis. However, this is not critical and a coarser grating can be used particularly with red and blue where the definition need not be quite as high as for green, and overall effects are good. Pleasing and acceptable pictures can be provided even with low definition in individual colors, although the smaller the plate separation the better from the standpoint of a high quality picture.

With tube arrangements heretofore known, it has been possible for the scanning cathode ray beam entering the space between the strips or plates 13 and 14 of the grating to come within the influence of a deflecting electrical field sufficient to cause the beam to strike one or the other of the strips 13 and 14. When this occurs the impacting electron beam as it strikes the strips or plates will produce luminous effects of intensities commensurate with the control or modulating signals applied on the beam itself. With proper coordination between the application of potentials to the plate 13 and 14 and the modulation of the scanning cathode ray beam 5 as it is moved to trace the raster on the tube end wall 3, it will be appreciated that proper color relationship between the light emitted from the impacted phosphor and the signal controlling the cathode ray beam is achieved.

However, since the impacting electron beam when it strikes the plates or strips 13 and 14 is moving in a path such that the angle of impact is small, it will be appreciated that the resultant beam may leave the impacted plate or strip along a path forming an angle to the plate which corresponds susbtantially to the angle along which the beam initially reached the plate. Under these circumstances, and even though the impacting scanning cathode ray beam has given up a great deal of its energy as it impacts the plate, it nonetheless is still in the form of a partially focused bundle of electrons capable of exciting generally weak intensity luminescent effects from the final target area or phosphor coating on the viewing window 3. While the intensity of the effect resulting from such beam impact, in the illustration herein made, is a relatively low luminosity green image signal, it is nonetheless a signal which has been modulated as red or blue, but which is actually producing not only a red image or a blue image, but also, in the illustration assumed, a green image. It will be appreciated that this tends to cause some color contamination, and any loss of color fidelity, while tolerable as a general proposition, is not to be desired where the highest quality color reproduction is to take place.

Figure 4:
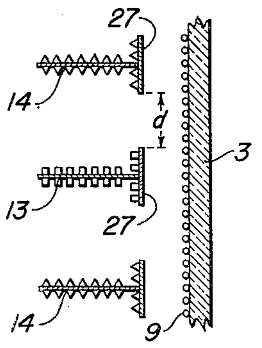

To preclude this possibility, there is secured along the edge of the strips or plates 13 and 14 forming the grating 7, a baffle barrier or structure 25 which is located at the edge of the grating strips adjacent the luminescent coating 9 on the tube end wall target 3. The baffle 25 is formed, as shown by Fig. 4, for instance, as a flat strip 27 secured to the edge of the grating strip 13 by suitable attachment along its circular long dimension bisector to the grating strip. The overlap of the baffle with respect to the grating strip 13 or 14 is for a distance which represents a minor fraction only of the separation between adjacent strips 13 and 14, but which is sufficient to prevent those electrons of the scanning cathode ray beam which reach the plate or strip 13 or 14 from above or below from being directed therefrom along low angle trajectory toward the phosphor coating 9 on the end wall or target 3. The baffles extend outwardly from the strips 13 and 14 to a distance sufficiently great to just barely intercept such electrons, and yet the adjacent baffle strips 27 are sufficiently separated at their edges, as represented illustratively by the dimension "*d*" in Fig. 4 that the undeflected scanning cathode ray beam passing between the plates to the target area shall not impinge thereupon.

Again it should be mentioned at this point that the diaphragms of application Serial No. 157,943 and the focusing of the beam at the region of the end target as set in concurrently filed application (hereinbefore mentioned) become important adjuncts to this proposal and should be considered as providing, when used, improved operation of the structure herein described.

While the baffle strips 27 are formed of electron-impermeable material, they nonetheless are essentially transparent in nature. Accordingly, the baffles may be coated on the side thereof next adjacent the phosphor-coated conducting strips 13 and 14 of the grating 7 with a luminescent compound or phosphor corresponding to that used to coat the strip to which they are attached. In this way electrons of the scanning beam leaving the phosphor-coated surfaces 13 and 14 and passing in the direction of the tube end wall 3 to reach the phosphor coating 9 thereof, instead of exciting the end wall phosphor coating to provide an inherent color contamination, are utilized to augment the light resulting from cathode ray scanning beam excitation of the phosphor coatings on the grating strips. The beam consequently produces light in the instantaneously desired color which may be viewed through the transparency of the baffle or barrier as light of the desired color, which thus improves the overall color fidelity of the image representation. In some instances it has been difficult to obtain phosphors, particularly red phosphors, which have characteristics, when excited by an impinging electron beam, such that the precise color light most desirable for achieving the most satisfactory color representation on all colors is obtainable. To improve the color response, it occasionally becomes desirable to attach to the surface of the baffle or barrier strip a central color filter designated, illustratively in Fig. 5, for instance, at 29 and 31 respectively where the filter 29 in the illustration proposed transmits red light and the filter 31 transmits blue light. These filters are sharply peaked in their response and have light-transmitting characteristics which are, however, generally in the region corresponding to that of the light developed on the phosphor coating of the strip of the grating adjacent thereto. Needless to say, a filter of this character has the desirable property of supplying, as it were, advantageous or desired characteristics to improve color fidelity. Under these circumstances, variances from the precisely desired color of light as developed by electron beam impact on the phosphor coatings of the strips 13 and 14 may be adjusted, to some extent, by the addition of the color filters.

The translucent phosphor coating 9 on the tube end wall 3 permits the light directed through the filters to pass therethrough in the same manner as did the light directly developed from the beam impacting the phosphor coating strip itself.

Figure 3:
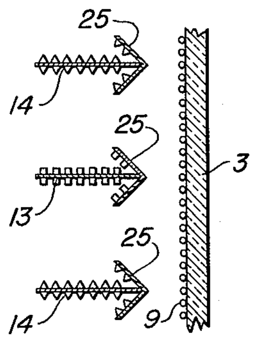
Figs. 3, 4 and 5 represent schematically various forms of baffle elements which may be utilized with the flat strip-like elements of the grating exemplified schematically by Fig. 1 of the drawings and shown more particularly in the copending application Serial No. 150,732 already mentioned.
Figure 5:
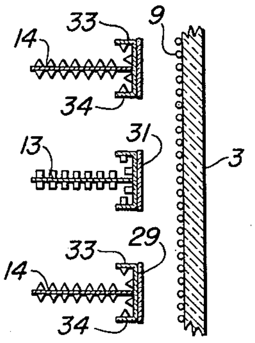

The arrangements depicted by Figs. 3, 4 and 5 show grating strips and baffles or barriers attached thereto which assume various configurations. In the modification of the arrangement of Fig. 4, as represented by the showing in Fig. 3, it will be observed that the flat baffle or barrier strip 27 of Fig. 4 has now been bent to a somewhat V-shaped or trough-like configuration such that the open end of the V is toward the phosphor coated strips of the grating and the apex of the V forms the line of attachment to the grating strip itself. The modification of Fig. 5 adds to the structure of Fig. 4 side portions 33 and 34 for the baffle or barrier strip such that the configuration is generally in the form of an elongated U-shaped trough, wherein the bottom and sides may each be coated with the suitable light-producing phosphor to improve the operation as above explained.

Other baffle or barrier configurations of course are apparent, and one of which is suitable for use in the arrangement naturally would be the semi-cylindrical element which is attached in a manner similar to that decribed for the flat baffle or barrier member of Fig. 4.

From what has been mentioned herein it will at once become apparent that reference to "phosphors" is intended to be understood as meaning those substances or solids which produce light upon absorbing suitable primary energy, such as the electrons of a cathode ray electron scanning beam. Such light radiation will be understood as luminescence and to be of the spectral range of the excited material. From this it also follows that any reference herein to "primary" or "component" colors means those colors which form the fundamental colors from which color television images may be recreated. In an additive polychrome system of the tricolor variety these "component" or "primary" colors are usually regarded as being red, green and blue.

Lastly, for ease of understanding it will be understood that while the gratings and baffles have been most particularly shown with slight spacing from the final target area of the tube (usually the phosphor coating upon its impacted end wall) it is nonetheless possible, and even desirable in some instances, to support the grating and baffles so as to place it in a contiguous state with that target. Hence, reference to the grating and baffles being in proximity to the tube target will be understood as meaning generally close thereto although actual contact therewith is not precluded.

Having now described the invention, what is claimed is:

1. In a cathode ray tube for producing polychrome television images visible from a tube end wall and developed within the tube under the control of a modulatable electron scanning beam, the target combination comprising a translucent phosphor coating in the path of the scanning beam and emissive of light of one primary color; a grating formed of a plurality of mutually-insulated conductive strips extending in planes generally substantially perpendicular to the translucent phosphor coating and in proximity thereto, phosphor coating on said strips emissive, under scanning beam impact, of light of different primary color from that of the first coating, said grating being located intermediate the translucent phosphor coating and the originating point of the beam; and a substantially transparent electron-impermeable baffle secured at the end of each conductive strip nearest to the translucent phosphor coating and extending outwardly to each side of the said grating strip.

2. The cathode ray tube claimed in claim 1 wherein alternate conducting strips of the grating are coated with phosphors having light emissions of different primary colors under beam impact thereon, and electrical connections between each conducting strip having like color light-emitting phosphor coatings.

3. The cathode ray tube claimed in claim 2 comprising, in addition, a color filter on the side of the baffle adjacent the translucent phosphor coating, said filter having a light-transmitting characteristic which is peaked substantially in the region corresponding to that of the light developed from the phosphor coating on the grating strip adjacent thereto.

4. The cathode ray tube claimed in claim 3 wherein each baffle comprises a substantially flat elongated strip of substantially transparent material, and means for securing the said baffle strip to the adjacent grating strip along a line corresponding substantially to the bisector of the baffle strip along its long dimension.

5. A cathode ray tube as claimed in claim 4 wherein the baffle strip is bent inwardly from its connection to the grating strip so that the outward edges of the baffle face toward the grating strip and are more remote from the translucent phosphor than the attaching edge.

6. The cathode ray tube claimed in claim 5 wherein the baffle strip comprises an elongated trough-like element secured along its central long dimension bisector to the grating strip, and wherein the so-secured strip forms a cuplike attachment to the grating strip.

7. In a cathode ray tube for producing polychrome television images visible from a tube end wall and developed within the tube under the control of a modulatable scanning electron beam generated within the tube and deflected relative to the tube end wall in a bidimensional pattern, the target combination comprising a translucent phosphor coating in the path of the scanning beam and emissive of light of one primary color; a grating formed of a plurality of substantially parallelly positioned mutually-insulated conductive strips supported with the edges of the strips in proximity to the said coating so that the strips extend substantially perpendicular to the coating and in such position that the beam passes between the grating plates to reach the translucent coating, a phosphor coating on the strips emissive, under scanning beam impact, of light of a different primary color from that of the first coating, said grating being located intermediate the translucent phosphor coating and the point of beam origin; a substantially transparent electron-impermeable baffle secured at the end of each conductive grating strip nearest to the translucent phosphor coating and extending outwardly to each side of the said grating strip; and electrical connections to apply operating and control potentials to the said conducting strips.

8. The cathode ray tube claimed in claim 7 wherein alternate conducting strips of the grating are coated with phosphors having light emissions of different primary colors under electron beam impact thereon.

9. The cathode ray tube claimed in claim 8 comprising, in addition, a color filter on the side of the baffle faced toward the translucent phospher coating, said color filter having a light-transmitting characteristic within the general light wavelength corresponding to that of the light developed from the phosphor coating on the grating strip adjacent thereto.

10. The cathode ray tube claimed in claim 9 wherein each baffle comprises a substantially flat elongated strip of substantially transparent material, and means for securing the said baffle strip to the adjacent grating strip along a line corresponding substantially to the bisector of the baffle strip along its long dimension.

11. A cathode ray tube as claimed in claim 10 wherein the baffle strip is bent inwardly from its connection to the grating strip so that the outward edges of the baffle face toward the grating strip and are more remote from the translucent phosphor than the point of attachment.

12. The cathode ray tube claimed in claim 11 wherein the baffle strip comprises an elongated trough-like element secured along its central long dimension bisector to the grating strip, and wherein the so-secured strip forms a cuplike attachment to the grating strip.

13. In a cathode ray tube for producing polychrome television images visible from a tube end wall and developed within the tube under the control of a modulatable scanning electron beam, the target combination comprising a translucent phosphor coating in the path of the scanning beam and emissive of light of one primary color; a grating formed of a plurality of mutually-insulated conductive strips extending in planes generally substantially perpendicular to the translucent phosphor coating and in proximity thereto; a phosphor coating on said strips emissive, under scanning beam impact, of light of a different primary color from that of the first coating, said grating being located intermediate the translucent phosphor coating and the point of beam origin; a substantially transparent electron-impermeable baffle secured at the end of each conductive grating strip nearest to the translucent phosphor coating and extending to opposite sides of the grating strip; a coating of a phosphor of light emission like that of the grating strip coating the baffle surface nearest the grating strip; and electrical connections to apply operating and control potentials to the said conducting strips.

14. In a cathode ray tube for producing polychrome television images viewable upon a translucent end wall of the tube when developed under the control of the electron beam generated within the tube, and wherein the electron beam so generated is arranged to trace the tube end wall in a generally bidimensional pattern, the target combination comprising a translucent phosphor coating upon the tube end wall interior surface and emissive of light in one primary color under impact of the generated electron beam; a grating comprising a plurality of elongated conducting plates arranged in mutually-insulated layer-like fashion relative to one another and spaced from one another and with the said strips supported edge-on relative to the source of the control electron beam and substantially normal to the surface of the translucent phosphor, said grating-like plates varying from a position substantially normal to the surface translucent phosphor in a region coinciding with that of the impacting control electron beam in an undeflected state to a position departing from normal at positions corresponding to extremes of beam deflection in one direction by an angle substantially coinciding with the maximum departure from normal impact of the control beam at extremities of its motion; a phosphor coating on the upper and lower surfaces of each of the conducting grating-like strips; electrical connections for applying control voltages to the grating strips so that during time periods when a potential difference exists between alternate grating strips the generated beam will impact that strip set which is at the most positive potential relative to an equilibrium value, and an electron-impermeable baffle strip secured to the end of each grating strip nearest the tube end wall and positioned at an angle relative thereto to arrest the control electron beam and to prevent the electron beam directed upon either of the sets of grating strips from subsequently impacting the substantially transparent phosphor light emissive coating of the target.

15. In a cathode ray tube for producing tricolor television images upon the tube end wall under the control of a modulatable electron scanning beam tracing a bidimensional raster, the target combination comprising a phosphor coating on the interior surface of the tube end wall in the path of the scanning beam to emit light of one component color of an additive tricolor combination under electron impact, a grating formed of a plurality of substantially parallelly positioned mutually insulated conductive strips supported with the long dimension of the strip edges in proximity to the said coating and with the strips extending in planes substantially perpendicular to the coating and in a position between the scanning beam source and the end wall coating such that the scanning beam passes therebetween to reach the said coating; means to electrically interconnect alternate grating plates to provide an interleaved grating with separate control potentials supplied thereto, a phosphor coating for emitting light of a second component color of the additive tricolor combination on one set of electrically connected plates of the interleaved combination and a phosphor coating emissive of light of the third component color of the additive tricolor combination on the other set of electrically conductive plates of the interleaved combination; and a substantially transparent electron-impermeable baffle secured at the end of each conductive grating strip nearest the translucent phosphor coating and extending outwardly to each side of the said grating strip for a distance representing a minor fraction only of the separation between adjacent grating strips.

16. In a cathode ray tube for producing polychrome television images upon the tube end wall under the control of a modulatable electron scanning beam tracing a bidimensional raster, the target combination comprising a phosphor coating on the interior surface of the tube end wall in the path of the scanning beam to emit under electron impact light of one component color of an additive tricolor, a grating formed of a plurality of substantially parallely positioned mutually insulated conductive strips supported with the long dimension of the strip edges in proximity including contact with the said coating and with the strips extending in planes substantially perpendicular to the coating and in a position between the scanning beam source and the tube end wall such that the scanning beam passes therebetween to reach the said coating; means to interconnect electrically alternate grating plates to provide an electrically interleaved grating, a phosphor coating for emitting light of a second component color of the tricolor on one set of electrically connected plates of the interleaved combination and a phosphor coating emissive of light of the third component color of the tricolor on the other set of electrically connected plates of the interleaved combination; and a substantially transparent electron-impermeable baffle secured at the end of each conductive grating strip nearest the translucent phosphor coating and extending outwardly to each side of the said grating strip for a distance representing a minor fraction only of the separation between adjacent grating strips.

17. The cathode ray tube claimed in claim 16 wherein each baffle comprises a substantially flat elongated strip of substantially transparent material, and means for securing the said baffle strip to the adjacent grating strip along a line corresponding substantially to the bisector of the baffle strip along its long dimension.

18. The cathode ray tube claimed in claim 17 wherein a light-producing phosphor is coated upon each baffle on the side thereof toward the electron beam source and wherein the so-coated phosphor produces light under electron beam excitation corresponding in color to the adjacent baffle coating.

ERNEST O. LAWRENCE.

REFERENCES CITED

The following references are of record in the file of this patent:

UNITED STATES PATENTS

| Number | Name | Date |
|---|---|---|
| 2,296,908 | Crosby | Sept. 29, 1942 |
| 2,307,188 | Bedford | Jan. 5, 1943 |
| 2,446,249 | Schroeder | Aug. 3, 1948 |
| 2,446,440 | Swedlund | Aug. 3, 1948 |
| 2,461,515 | Bronwell | Feb. 15, 1949 |
| 2,518,200 | Sziklai et al. | Aug. 8, 1950 |
| 2,529,485 | Chew | Nov. 14, 1950 |
| 2,543,477 | Sziklai | Feb. 27, 1951 |
| 2,566,713 | Zworykin | Sept. 4, 1951 |
| 2,568,448 | Hansen | Sept. 18, 1951 |
| 2,571,991 | Snyder | Oct. 16, 1951 |
| 2,577,038 | Rose | Dec. 4, 1951 |
| 2,577,368 | Schultz et al. | Dec. 4, 1951 |